(12) United States Patent
Carlson

(10) Patent No.: US 6,517,733 B1
(45) Date of Patent: Feb. 11, 2003

(54) CONTINUOUS FLOW LIQUIDS/SOLIDS SLURRY CLEANING, RECYCLING AND MIXING SYSTEM

(75) Inventor: Robin W. Carlson, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 09/613,663

(22) Filed: Jul. 11, 2000

(51) Int. Cl.$^7$ .................. B01D 37/00; B01D 21/26
(52) U.S. Cl. ............ 210/785; 210/787; 210/788; 210/800; 210/805; 210/806; 210/195.1; 210/196; 210/198.1; 210/201; 210/202; 210/203; 210/295; 210/304; 210/512.1; 210/512.2; 209/12.1; 209/729
(58) Field of Search ............... 210/785, 787, 210/788, 800, 805, 806, 195.1, 196, 198.1, 201, 202, 203, 295, 304, 512.1, 512.2; 209/12.1, 729; 134/10, 109

(56) References Cited

U.S. PATENT DOCUMENTS

| | | | |
|---|---|---|---|
| 2,668,620 A | 2/1954 | Fontein | |
| 2,671,560 A | 3/1954 | Fontein et al. | |
| 2,724,503 A | 11/1955 | Fontein | |
| 2,734,630 A | 2/1956 | Van Der Wal | |
| 2,765,918 A | 10/1956 | Fontein et al. | |
| 2,816,658 A | 12/1957 | Braun et al. | |
| 2,975,896 A | 3/1961 | Hirsch | |
| 3,057,476 A | 10/1962 | Gilbert | |
| 3,136,723 A | 6/1964 | Erwin et al. | |
| 3,237,777 A | 3/1966 | Brown et al. | |
| 3,306,444 A | 2/1967 | Troland | |
| 3,371,794 A | 3/1968 | Johnson | |
| 3,404,778 A | 10/1968 | Woodruff et al. | |
| 3,764,008 A | * 10/1973 | Darley et al. | 208/390 |
| 3,800,946 A | 4/1974 | Reid et al. | |
| 3,817,388 A | 6/1974 | Trawinski | |
| 3,899,414 A | 8/1975 | Hansen | |
| 3,959,123 A | 5/1976 | Wikdahl | |
| 3,989,628 A | 11/1976 | Bier | |
| 4,019,980 A | 4/1977 | Beery | |
| 4,141,839 A | 2/1979 | Niemeijer | |
| 4,148,722 A | 4/1979 | Surakka et al. | |
| 4,152,253 A | 5/1979 | Summers | |
| 4,208,270 A | 6/1980 | Grieve et al. | |
| 4,226,726 A | 10/1980 | Rehm | |
| 4,233,160 A | 11/1980 | Macierewicz et al. | |
| 4,303,453 A | * 12/1981 | Jung et al. | 134/10 |
| 4,319,410 A | 3/1982 | Heilhecker et al. | |
| 4,372,845 A | 2/1983 | Fecske | |
| 4,400,267 A | 8/1983 | Brose | |
| 4,426,283 A | 1/1984 | Fecske | |
| 4,437,984 A | 3/1984 | King et al. | |

(List continued on next page.)

FOREIGN PATENT DOCUMENTS

| | | |
|---|---|---|
| FR | 2 636 669 A1 | 3/1990 |
| GB | 2 073 054 A | 10/1981 |

OTHER PUBLICATIONS

Copy of International Search Report Mailed Apr. 29, 2002.

*Primary Examiner*—David A. Reifsnyder
(74) *Attorney, Agent, or Firm*—Merchant & Gould P.C.

(57) ABSTRACT

A continuous flow slurry cleaning method, apparatus and system including a filter portion and a mud re-circulation manifold for receiving partially filtered slurry, containing the slurry and mixing the slurry with liquid ready for use and thereby enabling a continuous, re-circulating flow through the filter portion. The continuous flow slurry cleaning apparatus and system further include a tank for storing and delivering liquid ready to be used by a drilling machine. The continuous flow slurry cleaning method, apparatus and system further includes a mud circulation/agitation system for keeping solids in suspension and for mixing additives along with the liquid ready for use and thereby modifying the makeup of the liquid ready for use.

32 Claims, 11 Drawing Sheets

U.S. PATENT DOCUMENTS

| | | |
|---|---|---|
| 4,459,207 A | 7/1984 | Young |
| 4,541,933 A | 9/1985 | Arnold et al. |
| 4,545,899 A | 10/1985 | Pincus |
| 4,571,296 A * | 2/1986 | Lott .................. 210/512.1 |
| 4,572,787 A | 2/1986 | Robinson |
| 4,608,174 A | 8/1986 | Kokkonen et al. |
| 4,636,308 A | 1/1987 | Summers |
| 4,655,923 A | 4/1987 | Leone |
| 4,657,678 A | 4/1987 | Kuhasalo et al. |
| 4,670,139 A | 6/1987 | Spruiell et al. |
| 4,676,809 A | 6/1987 | Fjallstrom et al. |
| 4,711,720 A | 12/1987 | Young |
| 4,773,989 A | 9/1988 | Pfalzer et al. |
| 4,857,197 A | 8/1989 | Young et al. |
| 4,876,016 A | 10/1989 | Young et al. |
| 4,927,536 A | 5/1990 | Worrell et al. |
| 4,940,535 A | 7/1990 | Fisher et al. |
| 4,956,090 A | 9/1990 | Robinson |
| 4,960,525 A | 10/1990 | Dalby et al. |
| 4,964,994 A | 10/1990 | Wakley et al. |
| 5,096,587 A | 3/1992 | Charette |
| 5,131,980 A | 7/1992 | Chamblee et al. |
| 5,154,826 A | 10/1992 | Prendergast et al. |
| 5,190,645 A | 3/1993 | Burgess |
| 5,221,476 A | 6/1993 | Papetti et al. |
| 5,225,082 A | 7/1993 | Young et al. |
| 5,336,410 A | 8/1994 | O'Brien et al. |
| 5,337,899 A | 8/1994 | Andersson et al. |
| 5,388,708 A | 2/1995 | Bouchillon et al. |
| 5,392,925 A | 2/1995 | Seyffert |
| 5,401,411 A | 3/1995 | Andersson |
| 5,447,632 A | 9/1995 | Andersson |
| 5,499,720 A | 3/1996 | Bouchillon et al. |
| 5,507,958 A | 4/1996 | White-Stevens |
| 5,582,727 A | 12/1996 | Foster |
| 5,593,582 A | 1/1997 | Roff, Jr. |
| 5,598,930 A | 2/1997 | Leone et al. |
| 5,641,070 A | 6/1997 | Seyffert |
| 5,683,580 A | 11/1997 | Young |
| 5,685,982 A | 11/1997 | Foster |
| 5,732,828 A | 3/1998 | Littlefield, Jr. |
| 5,811,003 A | 9/1998 | Young et al. |
| 5,819,955 A | 10/1998 | Clarke |
| 5,840,198 A | 11/1998 | Clarke |
| 5,853,583 A | 12/1998 | Shah |
| 5,921,399 A | 7/1999 | Bakula et al. |
| 6,077,437 A * | 6/2000 | Hayashi et al. .............. 134/10 |

* cited by examiner

CONTINUOUS FLOW LIQUIDS/SOLIDS SLURRY CLEANING, RECYCLING AND MIXING SYSTEM

TECHNICAL FIELD

A continuous flow liquids/solids slurry cleaning, recycling and mixing method, apparatus and system used with drilling apparatus in drilling operations for cleaning slurries so that solids and liquids are separated from each other in a continuous process.

BACKGROUND

Conventional liquids/solids (slurry hereinafter), recycling and mixing systems generally include several components such as a pit pump, a shaker screen, a primary tank, one or more secondary tanks, reservoir tanks and mixing systems. The pit pump is generally provided for delivering a slurry from a drilling rig to the slurry cleaning, recycling and mixing system. The shaker screen is generally provided for performing an initial removal and separation of solid constituents of the slurry. The tank, generally known as the sand trap, is provided for containing the liquid constituent of the slurry after it has passed over the shaker screen.

The tank allows additional solids to settle out of the slurry before passing over a top weir and to additional secondary tanks. The secondary tanks ranging from a single tank for holding partially cleaned mud to multiple tanks serving as reservoirs can also be provided. The secondary tanks are generally used as reservoirs for desander/desilter systems. The multiple tanks generally serve as reservoirs for a variety of other systems used in drilling operations including degassers, desanders, desilters and centrifuges.

Additional tanks can also generally be provided for holding a reservoir of completely cleaned mud slurry that is ready to be reused by a drilling rig and mixed with other materials that are useful in drilling operations. For example, mud slurries used for drilling are generally mixed prior to reuse by adding polymers or Bentonite as may be required by a given drilling operation. Accordingly, the mixing systems are generally provided for initial mixing of the Bentonite and/or the polymers.

However, the related art systems described above have several disadvantages. First, the tanks are typically square and thus as slurries flow through them, there is a wide variation in the flow velocity of the slurry within the tanks. For example, in some areas, the flow velocity of the slurry approaches zero and allows the solids to settle out of suspension in a process known as sedimentation. As sedimentation occurs, the tanks eventually fill with the sedimentary solids and require periodic cleaning. Having to conduct periodic cleaning is disadvantageous because it requires additional labor for cleaning the tanks. Moreover, opening the tanks creates a potential for environmental contamination by the inevitable spilling of the tank's contents in the local environment. Furthermore, the periodic cleaning operation results in additional cost in making the tanks accessible for cleaning. In order to reduce the sedimentation, several conventional systems have added a mechanical agitator to each tank in an effort to keep the solids in suspension.

Other disadvantages of conventional systems include having a significant volume of slurry in process and thereby rendering a portion of that slurry unavailable as cleaned slurry ready for use in the end operation, e.g., drilling. Moreover, in conventional systems the slurry passes through each various filtering component one at a time.

SUMMARY

The present invention is generally directed to a continuous flow slurry cleaning, recycling and mixing system and method used with a drilling apparatus in drilling operations. The invention provides a method, apparatus and system for cleaning slurry so that the solid and liquid constituents of the slurry can be separated in a continuous process. The invention also provides continuous circulation of slurry which keeps solids in suspension and maintains an adequate slurry fluid velocity.

One aspect of the invention provides a method of cleaning liquid/solids slurry having first and second filter stages. The method includes filtering the liquid/solids slurry at the first filter stage; mixing the filtered slurry with liquid ready for use; and re-circulating the mixed liquid through the second filter stage.

An alternative aspect of the invention provides an apparatus for cleaning liquid/solids slurry. The apparatus includes a tank; first and second filter stages, each filter stage having an input portion and output portion, the input portion of the first filter stage being adapted to receive liquid/solids slurry to be cleaned, the first and second filter stages being adapted to filter the liquid/solids slurry; and a manifold in fluid communication with the output portion of the first filter stage and the tank, the manifold being arranged to receive and mix the filtered liquid with liquid ready for use; wherein, the mixed liquid is transferred from the manifold to the second filter stage.

Yet another alternative aspect of the invention provides a system for cleaning liquid/solids slurry. The system includes a drilling apparatus; and an apparatus for cleaning liquid/solids slurry. The apparatus includes a tank; first and second filter stages, each filter stage having an input portion and output portion, the input portion of the first filter stage being adapted to receive liquid/solids slurry to be cleaned, the first and second filter stages being adapted to filter the liquid/solids slurry; and a manifold in fluid communication with the output portion of the first filter stage and the tank, the manifold being arranged to receive and mix the filtered liquid with liquid ready for use; wherein, the mixed liquid is transferred from the manifold to the second filter stage.

Still another alternative aspect of the invention provides a method of cleaning liquid/solids slurry. The method includes transferring the liquid/solids slurry to a first filter stage; separating solids from the slurry and discharging a first filter stage underflow liquid from the first filter stage; routing the first filter stage underflow liquid to a continuous suction manifold assembly; mixing the first filter stage underflow liquid with a second filter stage underflow liquid discharged from the second filter stage and liquid ready for use, resulting in a combined liquid mixture; transferring the combined liquid mixture to the second filter stage; routing the second filter stage underflow liquid from the second filter stage to the continuous suction manifold assembly; and discharging liquid ready for use from the second filter stage into a tank.

BRIEF DESCRIPTION OF THE DRAWINGS

Referring now to the drawings in which like reference numbers represent corresponding parts throughout the several views, where.

DESCRIPTION

In the following description of specific embodiments, reference is made to the accompanying drawings which form a part hereof, and in which is shown by way of illustration specific embodiments in which the invention may be practiced. It is to be understood that other embodiments may be made and used without departing from the scope of the invention, which is defined by the claims attached hereto.

Figure 1:
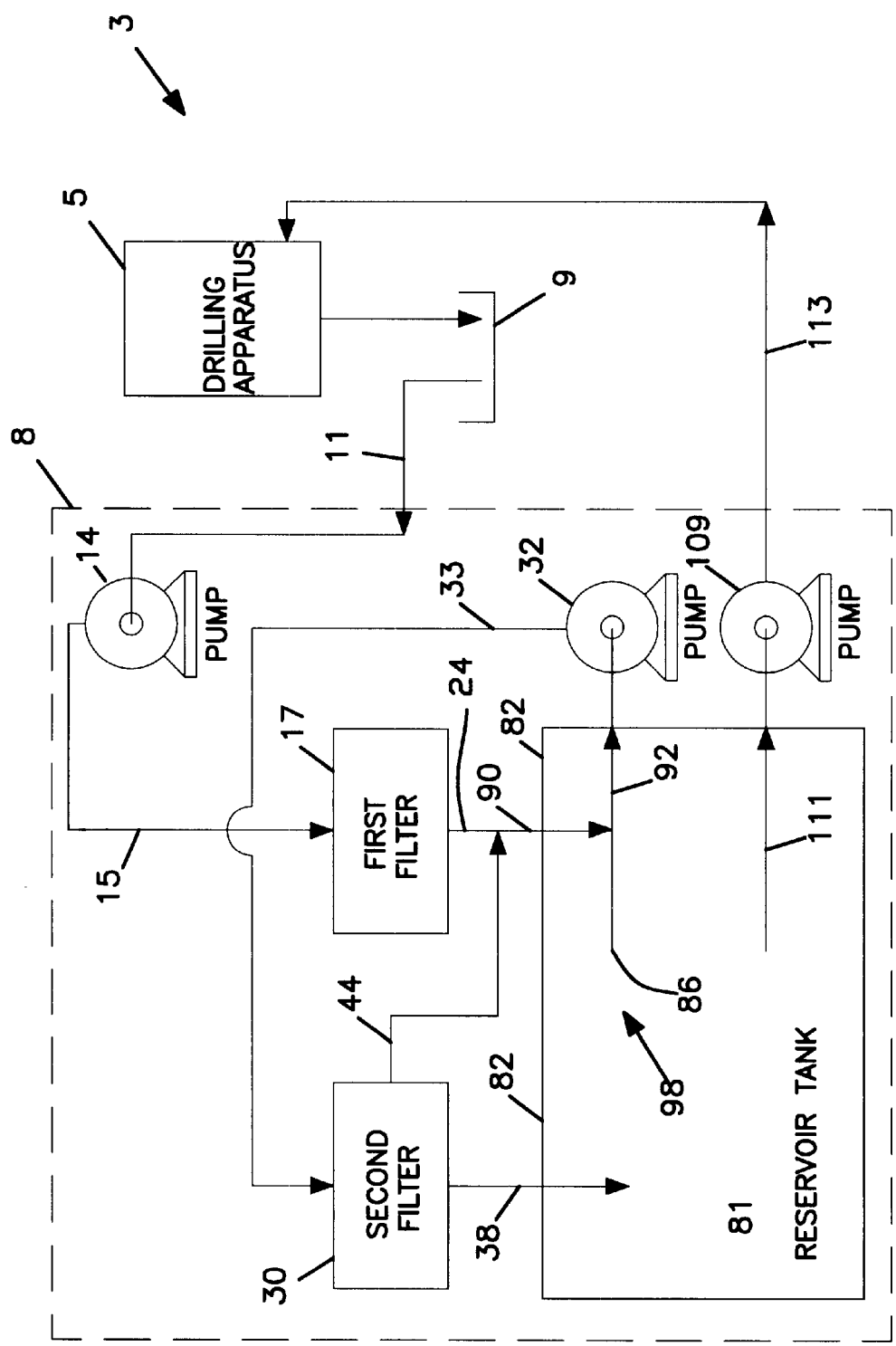
FIGS. 1–1C illustrate flow diagrams of several embodiments of a system of a slurry cleaning, mixing and recycling system in accordance with the present invention.

FIG. 1 illustrates a system 3 comprising a drilling apparatus 5 and a slurry cleaning, mixing and recycling system 8 for cleaning slurry laden with solids and other impurities that is pumped from the drilling apparatus 3. The slurry to be cleaned is continuously drawn from a slurry reservoir 9 by a pit pump 14 via a pit pump suction line 11 and is then routed to a first filter 17 (shaker hereinafter) via a slurry line 15. The shaker 17 outputs partially cleaned slurry comprising predominantly the liquid portion of the slurry (filtered slurry hereinafter) which then enters a Continuous Suction Multi-Mud Manifold Assembly 98 (manifold assembly hereinafter) through a combined underflow line 90. The filtered slurry from a second filter 30 (cleaner hereinafter) follows an underflow path 44 and is then combined with filtered slurry from the shaker 17. The combined filtered slurries enter the combined underflow line 90 and then enter the manifold assembly 98.

Upon entering the combined underflow line 90, a pump 32 draws the combined filtered slurries from the combined underflow line 90 into a multi-input suction line 92. Simultaneously, the pump 32 draws liquid ready for use 81 which is contained in a reservoir tank 82. The pump 32 draws the combined filtered slurries and liquid ready for use through an inlet orifice 86 into the multi-input suction line 92. The filtered slurries from the combined underflow line 90 and liquid ready for use 81 contained in the reservoir tank 82 merge in the multi-input suction line 92. The combined filtered slurries and liquid ready for use 81 leave the manifold assembly 98 and are pumped through a feed line 33 to the cleaner 30. The cleaner 30 is a combination filtration unit comprised of hydrocyclones and a shaker. The hydrocyclones separate the liquid constituent from the combined filtered slurries and liquid ready for use 81 that enter the second filter via the feed line 33 by way of pump 32. The second filter 30 outputs the underflow liquid into the reservoir tank 82 where it is combined with the liquid ready for use 81.

The liquid ready for use 81 stored in the reservoir tank 82 is drawn into a pump 109, in this case a rig charge pump, via a rig charge pump suction line 111. The pump 109 discharges liquid ready for use 81 from the tank 82 through discharge line 113. The liquid ready for use 81 is thus recycled to the drilling apparatus 5 for continued drilling.

Figure 1A:
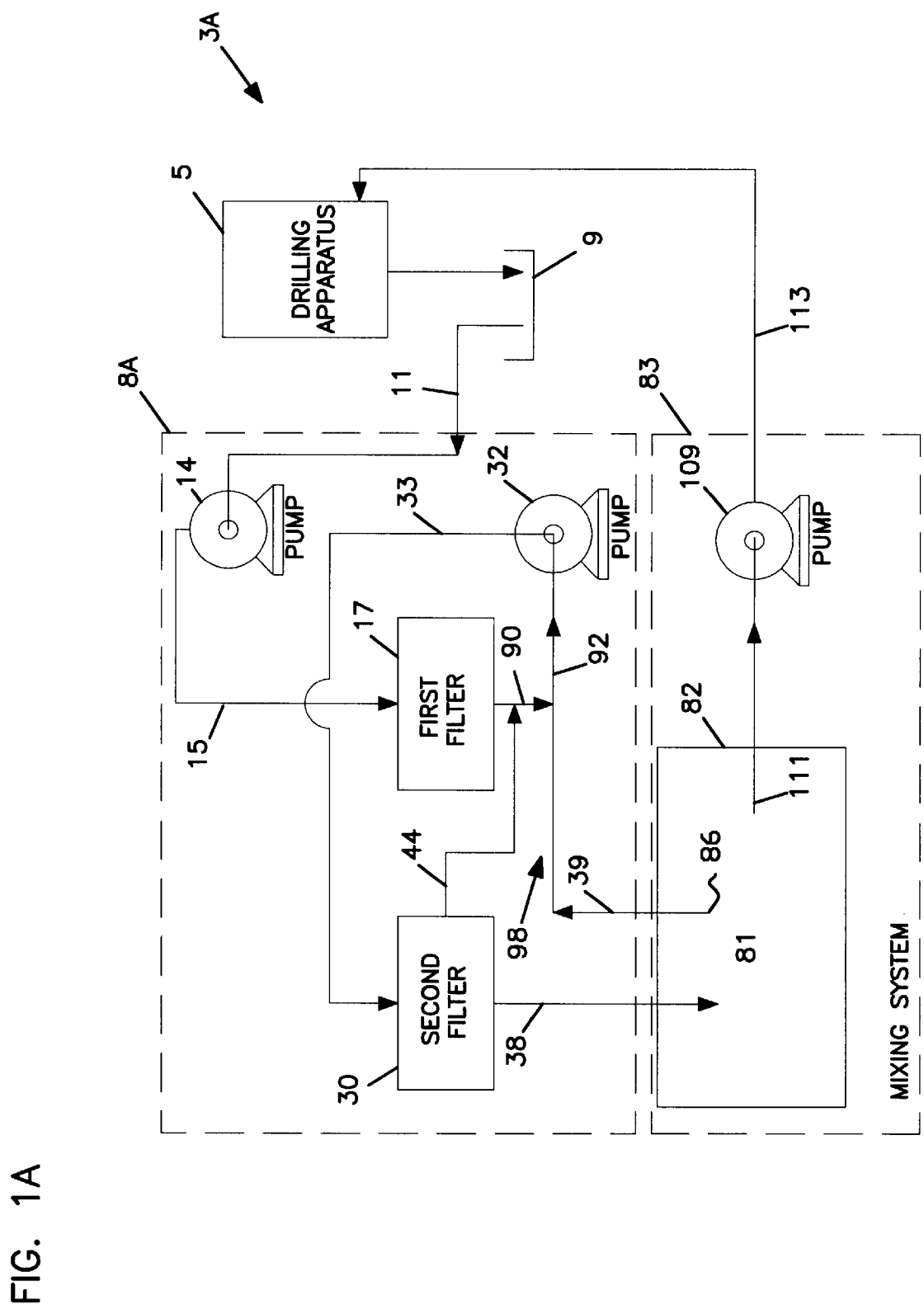

FIG. 1A illustrates a system 3A comprising a slurry cleaning, mixing and recycling system 3A for cleaning slurry that is pumped from a drilling apparatus 3A. The slurry cleaning, mixing and recycling system 3A is in fluid communication with a mixing system 83. The mixing system 83 is comprised of a reservoir tank 82 and a pump 109. Liquid ready for use 81 is drawn from the reservoir tank 82 through line 39 and subsequently flows into the manifold assembly 98.

Figure 1B:
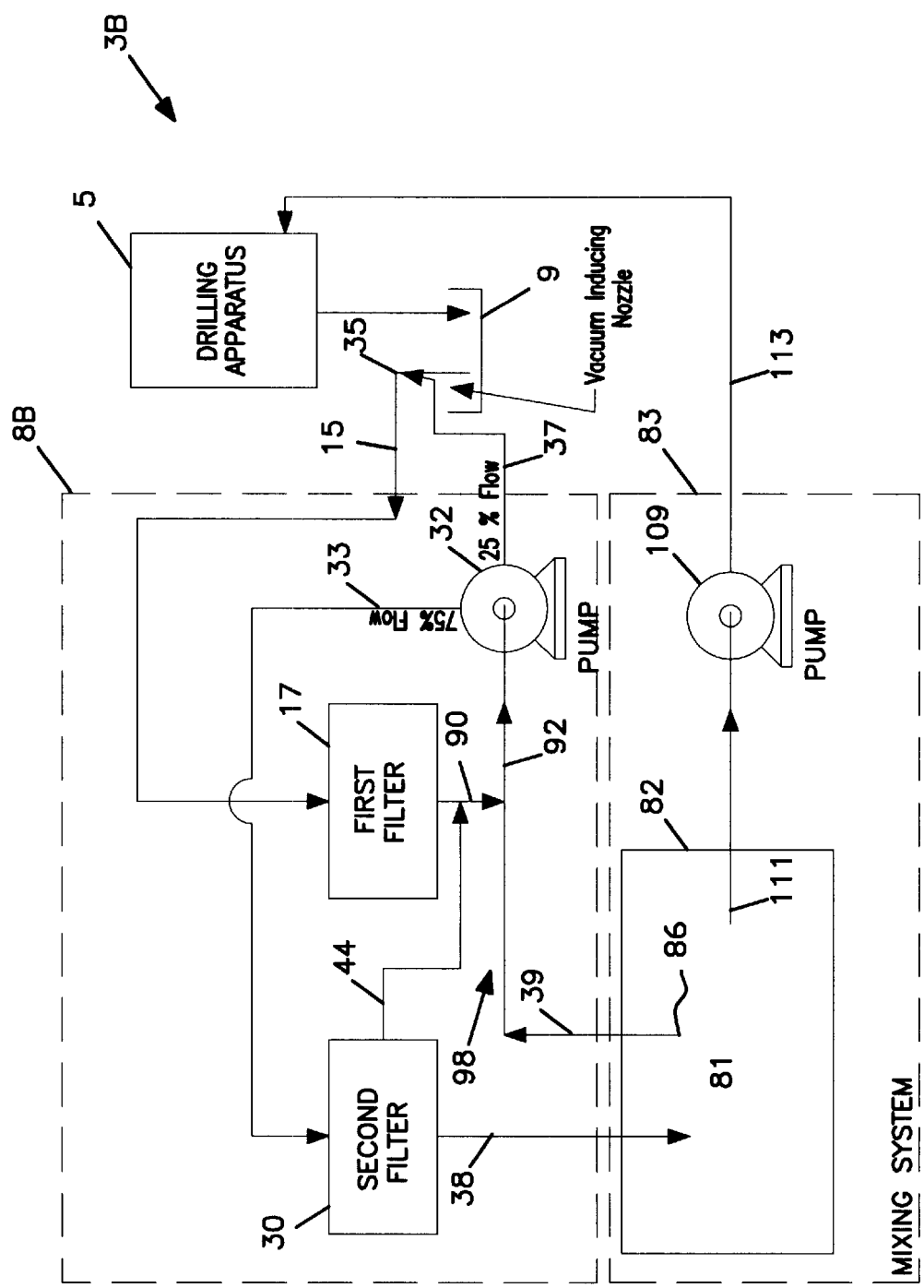

FIG. 1B illustrates a system 3B comprising a slurry cleaning, mixing and recycling system 8B for cleaning slurry that is pumped from a drilling apparatus 3B. The slurry cleaning, mixing and recycling system 8B is in fluid communication with a mixing system 83. Liquid ready for use 81 is drawn from line 39 and flows into the manifold assembly 98. The drilling system 3B further includes a vacuum inducing nozzle 35 which is coupled to the output of the pump 32 and to the slurry line 15. The vacuum inducing nozzle 35 transfers the slurry to be cleaned to the shaker 17 via the slurry line 15. Furthermore, the system 3B transfers 75% of the liquid ready for use 81 from the mixing system 83 to the cleaner 30 via the feed line 33. Accordingly, 25% of the liquid ready for use 81 is transferred to the vacuum inducing nozzle 35 via flow line 37.

Figure 1C:
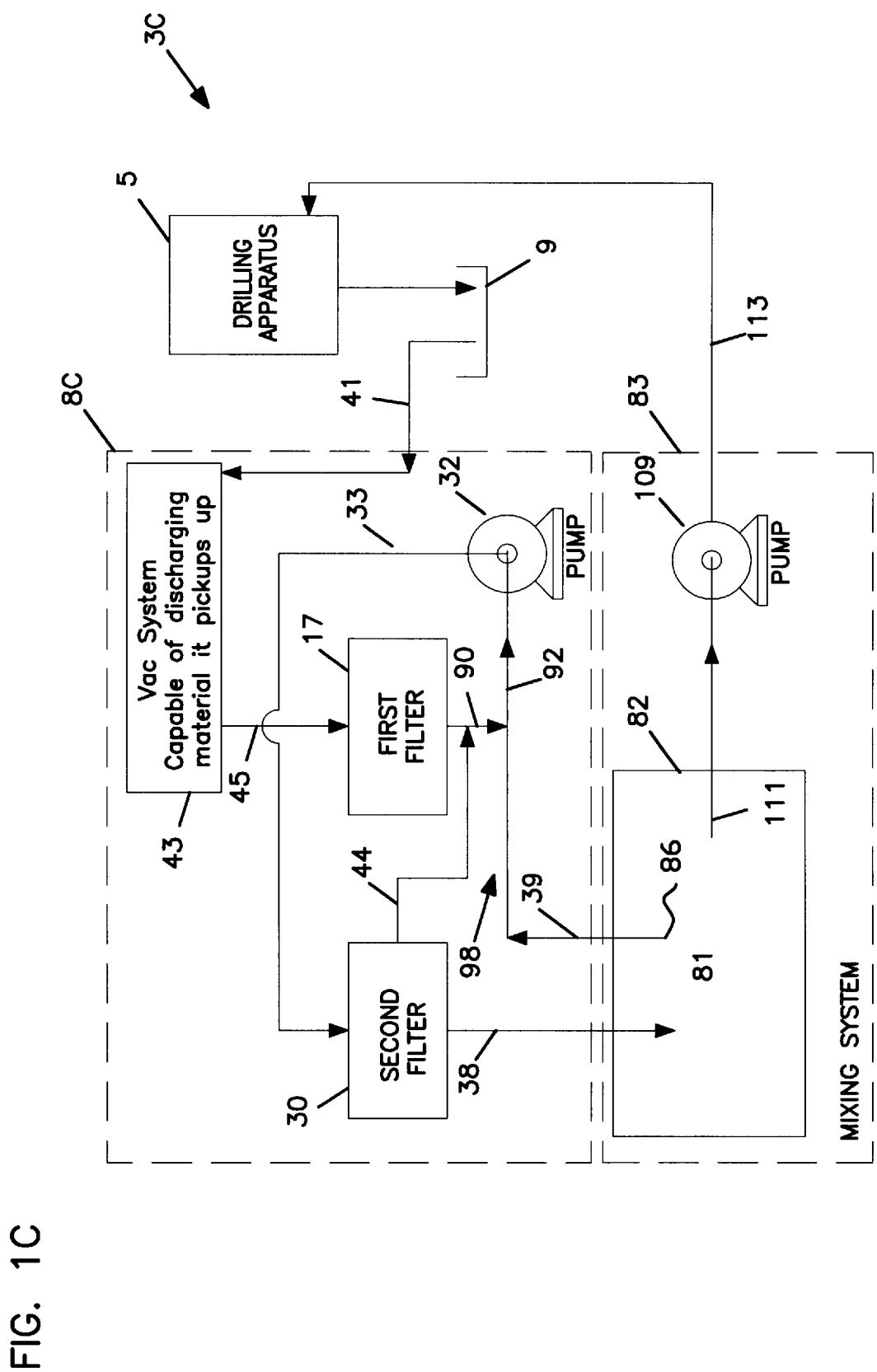

FIG. 1C illustrates a system 3C comprising a slurry cleaning, mixing and recycling system 3C for cleaning slurry that is pumped from a drilling apparatus 3C. The slurry is transferred by vacuum system 43 through flow line 41 and is then transferred to the shaker 17 through flow line 45.

Those skilled in the art will appreciate that a variety of filters such as shaker separators and hydrocyclones may be used in various series or parallel combinations to provide the necessary filtration function without departing from the scope of the claimed invention. Also, it will be appreciated that the outputs of the various filters may be brought together in various ways in order to combine the filtered slurry and mix it with the liquid ready for use 81 contained in the reservoir tank 82.

Figure 2:
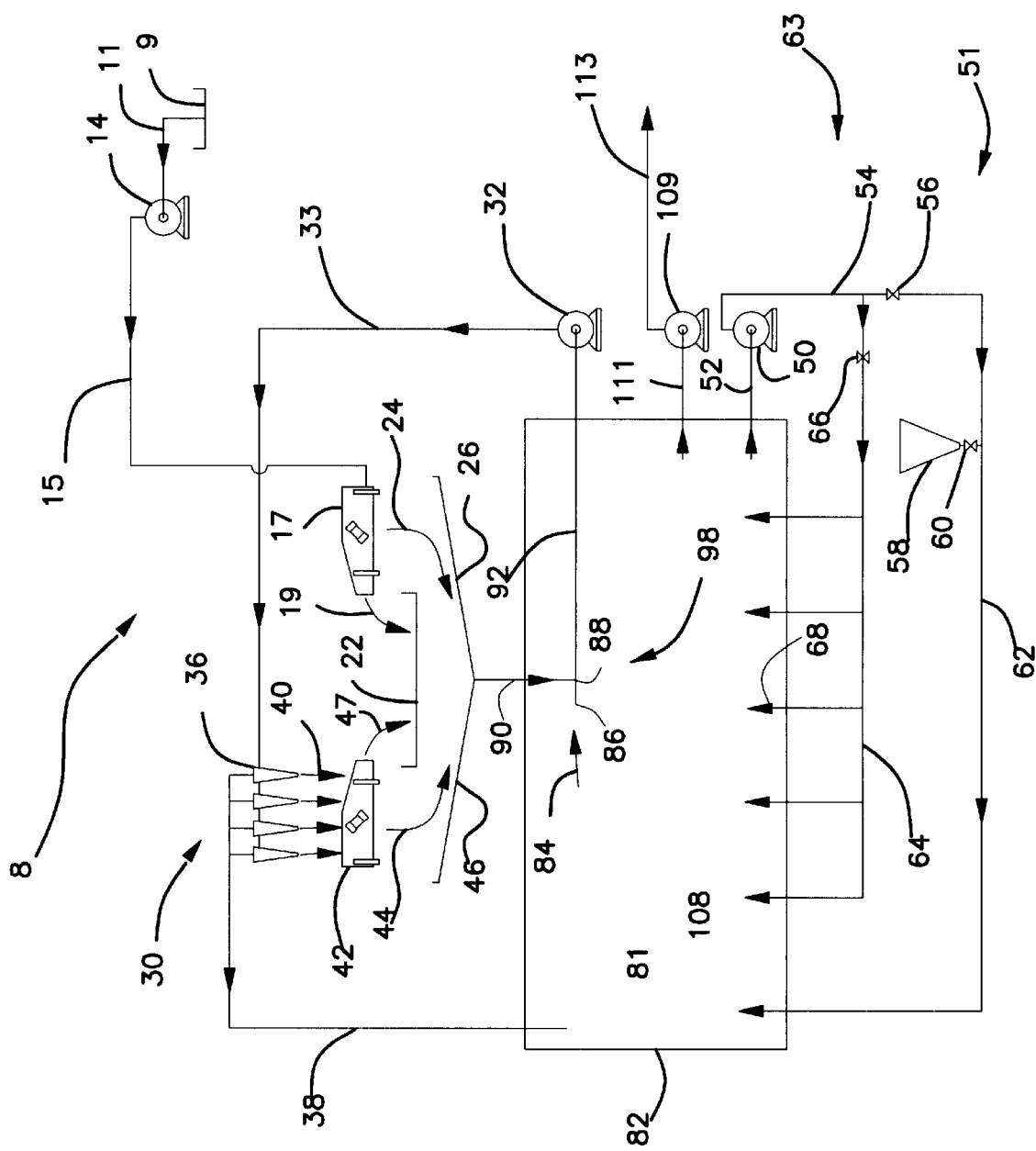
FIG. 2 illustrates a flow diagram of one embodiment of a slurry cleaning, mixing and recycling system including a manifold assembly in accordance with the present invention.

FIG. 2 illustrates a flow diagram of one embodiment of a closed loop slurry cleaning, mixing and recycling system 8. The system 8 can be used, for example, in the horizontal directional drilling industry. The slurry (e.g., drilling fluid, or mud) to be cleaned is pumped from the slurry reservoir 9. The cleaned slurry, liquid ready for use, is returned through the rig discharge line 113 to the drilling apparatus. One sequence for processing the slurry to be cleaned begins by pulling the slurry, a mixture of treated fluid and drilling solids, from the slurry reservoir 9 by the pit pump 14 via the pit pump suction line 11 and routing the slurry to the shaker 17 via the slurry line 15.

The slurry reservoir 9 includes liquid having a high percentages of drilling solids, e.g., entrained solids, silts and other impurities that normally accrue in the drilling fluid during subterranean boring. The pit pump 14 may be turned "ON" or "OFF" by an operator as needed, in order to regulate the level of slurry in the slurry reservoir 9. The shaker 17 separates the slurry into spoils comprising coarse drilling solids and partially cleaned liquid referred to herein as filtered slurry. The spoils follow a discharge path 19 and fall into a spoils discharge tank 22. The filtered slurry emanating from below the shaker 17 follows a shaker flow path 24 into the manifold assembly 98.

The manifold assembly 98 is a device that combines the processed drilling liquids at various stages of processing and controls their flow path. In one embodiment, the manifold assembly 98 includes underflow troughs 46 and 26, a combined underflow line 90, a combined underflow liquid merging fin 88, an inlet orifice 86, a multi-input suction line 92 and a cleaner pump 32.

Filtered slurry flowing from the shaker 17 via underflow path 24 enters the manifold assembly 98 from the shaker underflow trough 26. The combined filtered slurry and liquid ready for use from the cleaner flow via the underflow path 44 to the manifold assembly 98 from the cleaner underflow trough 46. Under the force of gravity, the shaker underflow fluid (e.g., the filtered slurry) and the cleaner underflow fluid (e.g., the filtered combined filtered slurry and liquid ready for use) merge into the combined underflow line 90. The combined underflow line 90 is sufficiently large to allow entrained air within the liquid from the cleaner underflow trough 46 and liquid from the shaker underflow trough 26 to escape before entering the combined underflow liquid merging fin 88.

The liquids from the shaker and cleaner underflow troughs 26, 46 merge into a combined liquid in the combined underflow line 90. The cleaner pump 32 then draws the combined liquid from the combined underflow line 90 into the multi-input suction line 92. Simultaneously, the cleaner pump 32 draws liquid ready for use 81 from the tank 82 through the orifice 86 into the multi-input suction line 92. The combined liquid from the combined underflow line 90 and liquid ready for use 81 subsequently merge in the multi-input suction line 92.

The amount of liquid ready for use 81 that is drawn into the multi-input suction line 92 depends upon the amount of combined liquid present in the combined underflow line 90 and the pre-set pumping rate of the cleaner pump 32. Under normal operating conditions, the cleaner pump 32 has a pumping rate that is greater than the pit pump 14. The amount of liquid ready for use 81 drawn into the multi-input suction line 92 is equal to the difference in output between the pit pump 14 and the cleaner pump 32. Regardless of the pumps' 14, 32 transfer rates, the multi-input suction line 92 will always contain some percentage of liquid ready for use 81.

In one embodiment, the manifold assembly 98 allows the liquid ready for use 81 to be mixed with the combined liquid from the combined underflow line 90 in such a manner that a wide variety of flow rates can exist without starving the cleaner pump 32. For example, if there is no flow from either shaker 17, 42, the cleaner pump 32 will draw 100% of the liquid ready for use 81 from within the tank 82.

When the pit pump 14 is turned off, the combined liquid within the multi-input suction line 92 includes a lower percentage of underflow fluid from the cleaner 30 and a higher percentage of liquid ready for use 81. When the pit pump 14 is turned "ON," the combined liquid within the multi-input suction line 92 includes a higher percentage of combined liquid from the combined underflow line 90 and a lower percentage of liquid ready for use 81.

Generally, the density of the liquid in the combined underflow liquid line 90 is higher than the density of the liquid ready for use 81 which is contained within the drilling mixing tank 82. Therefore, under the influence of gravity, the liquid within the combined underflow liquid line 90 will be drawn into the multi-input suction line 92 before the drilling liquid ready for use 81. However, if the density of the liquid in the combined underflow liquid line 90 is close to the density of the liquid ready for use 81, then a means to ensure that the liquid within the combined underflow liquid line 90 enters the multi-input line suction line 92 is required. This is accomplished by creating a low pressure area in the discharge area of the combined underflow liquid merging fin 88. From elementary fluid dynamics, if the velocity of a fluid passing through a given cross section is increased, then a low pressure condition will result.

The combined underflow liquid merging fin 88 provides a means for increasing the velocity of the liquid ready for use 81 as it moves through the manifold assembly 9. In one embodiment, the combined underflow liquid merging fin 88 has a small cross sectional area relative to the cross sectional area of the multi-input suction line 92. Through testing, it has been determined that the average velocity of the liquid ready for use 81 passing along the combined underflow liquid merging fin 88 is approximately 1.4 feet per second (fps), while the average velocity preceding the combined underflow liquid merging fin 88 is approximately 1.3 fps.

This slight increase in the average velocity of liquid ready for use 81 creates a slight pressure drop at the discharge side of the combined underflow liquid merging fin 88. This slight difference in pressure creates a slight vacuum acting on the liquid within the combined underflow liquid line 90, which may help to draw fluid through the combined underflow liquid merging fin 88. Additionally, the volume of liquid ready for use that is drawn through the inlet orifice 86 varies in response to changes in the volume of fluid being drawn through the combined underflow liquid merging fin 88 varies so that the volume of fluid that is drawn by the cleaner pump 32 is substantially consistent.

Accordingly, when the flow rate of fluid through the underflow liquid merging fin 88 is zero, there is minimal, if any, air that is drawn through the underflow liquid merging fin 88. Minimizing the amount of air that is drawn through the underflow liquid merging fin 88 prevents air pockets from reaching the cleaner pump 32 and thus minimized the chance that the cleaner pump 32 will lose its prime.

In contrast, if the design is such that the cross sectional area of the combined underflow liquid merging fin 88 is large relative to the cross sectional area of the multi-input suction line 92, then excessive vacuum is induced on the liquid within the combined underflow liquid line 90. In those cases when little or no liquid enters into the combined underflow liquid line 90, air will be sucked in the multi-input suction line 92, thereby resulting in loss of prime in the cleaner pump 32.

While the underflow liquid merging fin 88 is narrow in cross section, it has a long overall length. The length is dictated by the volumetric flow rate of the liquid with in the combined underflow liquid line 90 and the width of the combined underflow liquid merging fin 88.

In one embodiment, the design of the combined underflow liquid merging fin 88 has an aerodynamic profile having tapered leading and trailing edges. This aerodynamic profile will reduce unwanted disturbances in the liquid ready for use 81 as it flows past the liquid merging fin 88.

The combined fluid within the manifold assembly 98 is pumped through the cleaner feed line 33 to the cleaner 30 (the secondary cleaning system). The cleaner 30 is a combination filtration unit comprised of one or more hydrocyclones 36 and a secondary shaker 42. The hydrocyclones 36 separate the combined fluid from the cleaner feed line 33 into underflow liquid and liquid ready for use 81. The underflow fluid follows the hydrocyclones underflow path 40 and flows into the secondary shaker 42.

The secondary shaker 42 separates the liquid emerging from the hydrocyclone underflow path 40 into spoils and underflow liquid. The spoils follow the cleaner spoils discharge path 47 into the spoils discharge tank 22, while the secondary shaker underflow liquid follows the cleaner underflow path 44 to the cleaner underflow trough 46. As discussed above, the liquid flowing from the cleaner underflow trough 46 merges with the liquid from the primary shaker trough 26 and makes up the combined liquid which then flows into the manifold assembly 98.

The liquid discharged from the hydrocyclones 36 overflow, classified as the cleanest filtered liquid within the system 8, flows to the tank 82 via the cleaner overflow line 38. The tank 82 is designed with a flat bottomed semi-circular shape in order to reduce the number of "dead areas" where sedimentation may occur. The tank 82 includes an active flow system for keeping all of the liquid contained in the tank 82 in constant agitation. The active flow system comprises a mixing system 51 and a roll gun system 63.

The mixing system 51 is used to mix additives, such as Bentonite and polymers, with the liquid ready for use 81. In one embodiment, the mixing pump 50 draws liquid ready for use 81 from within the tank 82 via the mixing suction line 52. The liquid ready for use 81 is then pumped through the mixing/roll gun line 54 and the hopper fluid inlet valve 56. Additives may be mixed with the liquid ready for use 81 in the mixing hopper 58. The additives are mixed as they pass through the mixing discharge line 62. In one embodiment, a roll gun system 63 is used to thoroughly mix the additives combined with the newly treated liquid from the mixing discharge line 62 and the liquid ready for use 81 from within the tank 82.

The roll gun system 63 is to used to evenly mix the liquid from the cleaner overflow line 38, mixing discharge line 62 and the liquid ready for use 81, all within the tank 82. The roll gun system 63 is also used for keeping the additives and any other micro-solids 108 in suspension within the liquid ready for use 81. In one embodiment, the roll gun system 63 includes a mixing/roll gun line 54, a roll gun valve 66, a roll gun line manifold 64 and a plurality of roll gun jets 68.

In one embodiment, the liquid ready for use 81 is drawn from the tank 82 via the mixing suction line 52 by the mixing pump 50 and is delivered under pressure to the mixing/roll gun line 54. The liquid ready for use 81 passes through the roll gun valve 66, into the roll gun line manifold 64 and is discharged at a high velocity through the roll gun jets 68. The roll gun jets 68 are positioned to direct the, liquid flow towards the bottom of the tank 82, thus providing a rolling effect to the liquid flow. The velocity at which the liquid ready for use 81 passes through the roll gun jets 68 agitates the liquid ready for use within the tank 82, which keeps all of the unmixed additives and newly treated liquid from the mixing discharge line 62, micro-solids 108 and liquid ready for use 81, in suspension within the tank 82.

The micro-solids 108 remain suspended in the liquid ready for use 81 until they are either discharged from the tank 82 through the rig charge pump 109 or drawn into the manifold assembly 98. The liquid ready for use 81 is drawn into the rig charge pump 109 via the rig charge pump suction line 111 and discharged from the slurry cleaning, mixing and recycling system 8 through the rig charge pump discharge line 113.

Figure 3:
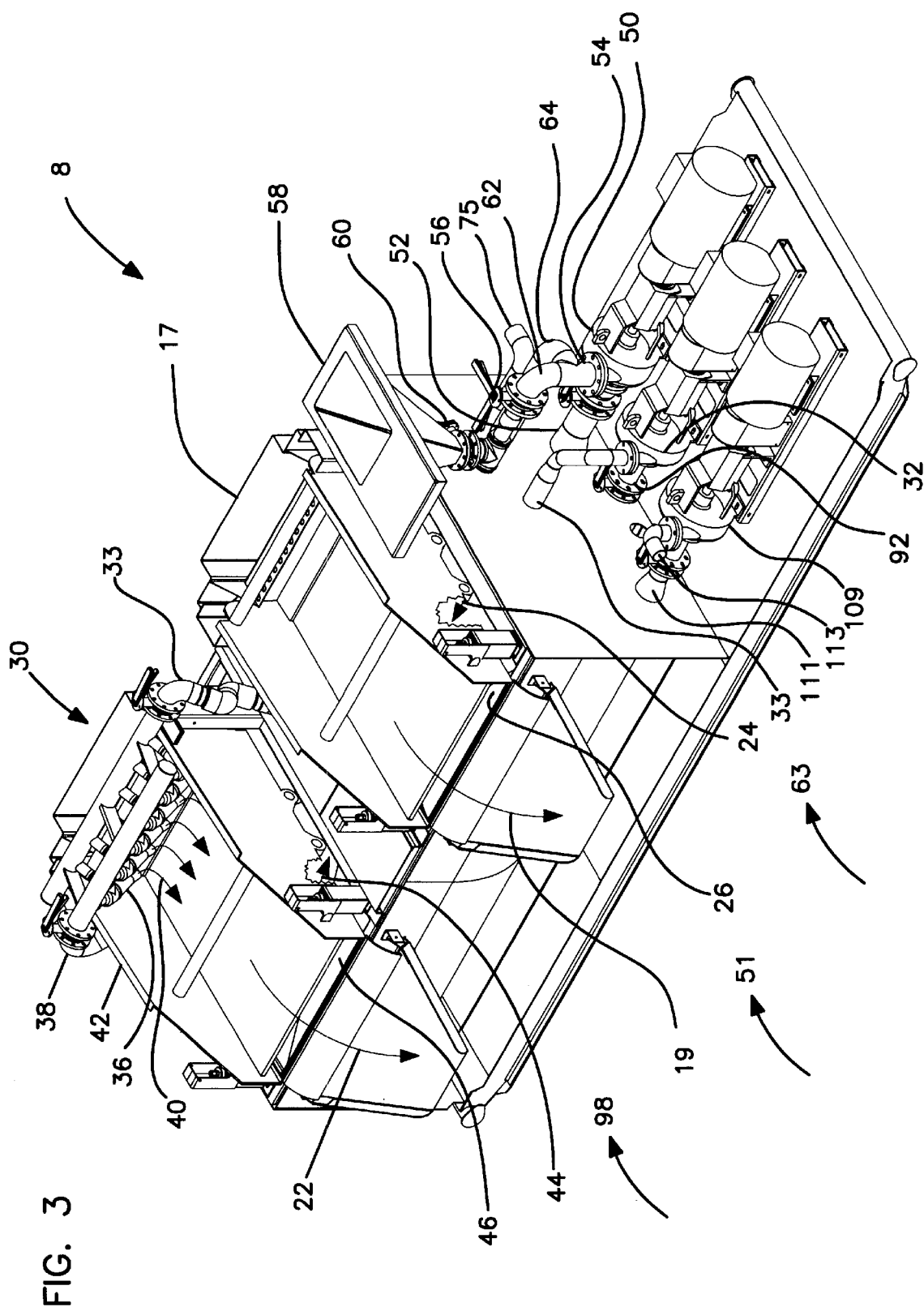
FIG. 3 is an isometric view of one embodiment of an enclosure of a slurry cleaning, mixing and recycling system in accordance with the present invention.
Figure 4:
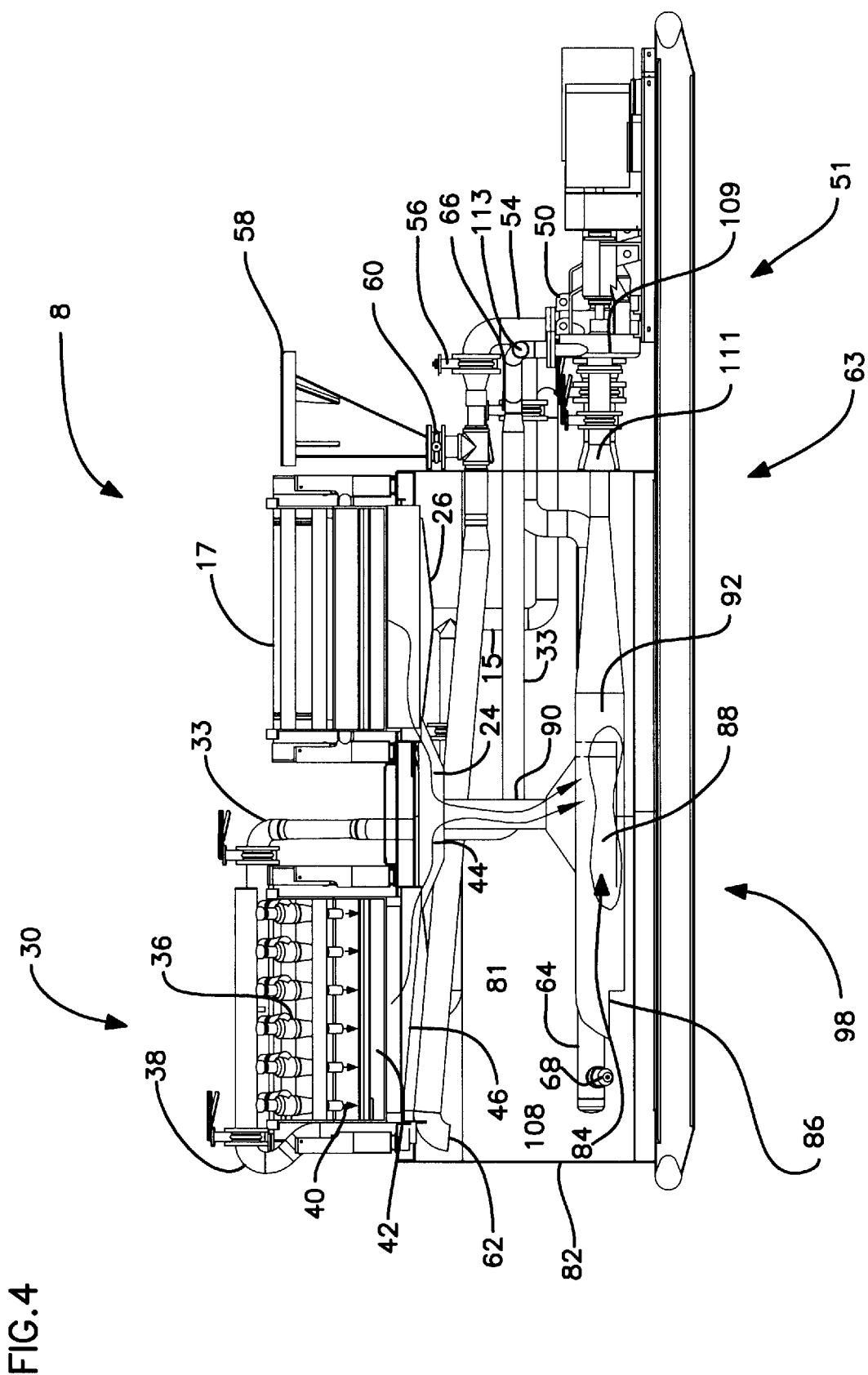
FIG. 4 is a side view of one embodiment of a slurry mixing and recycling system in accordance with the present invention with the near side tank wall removed.
Figure 5:
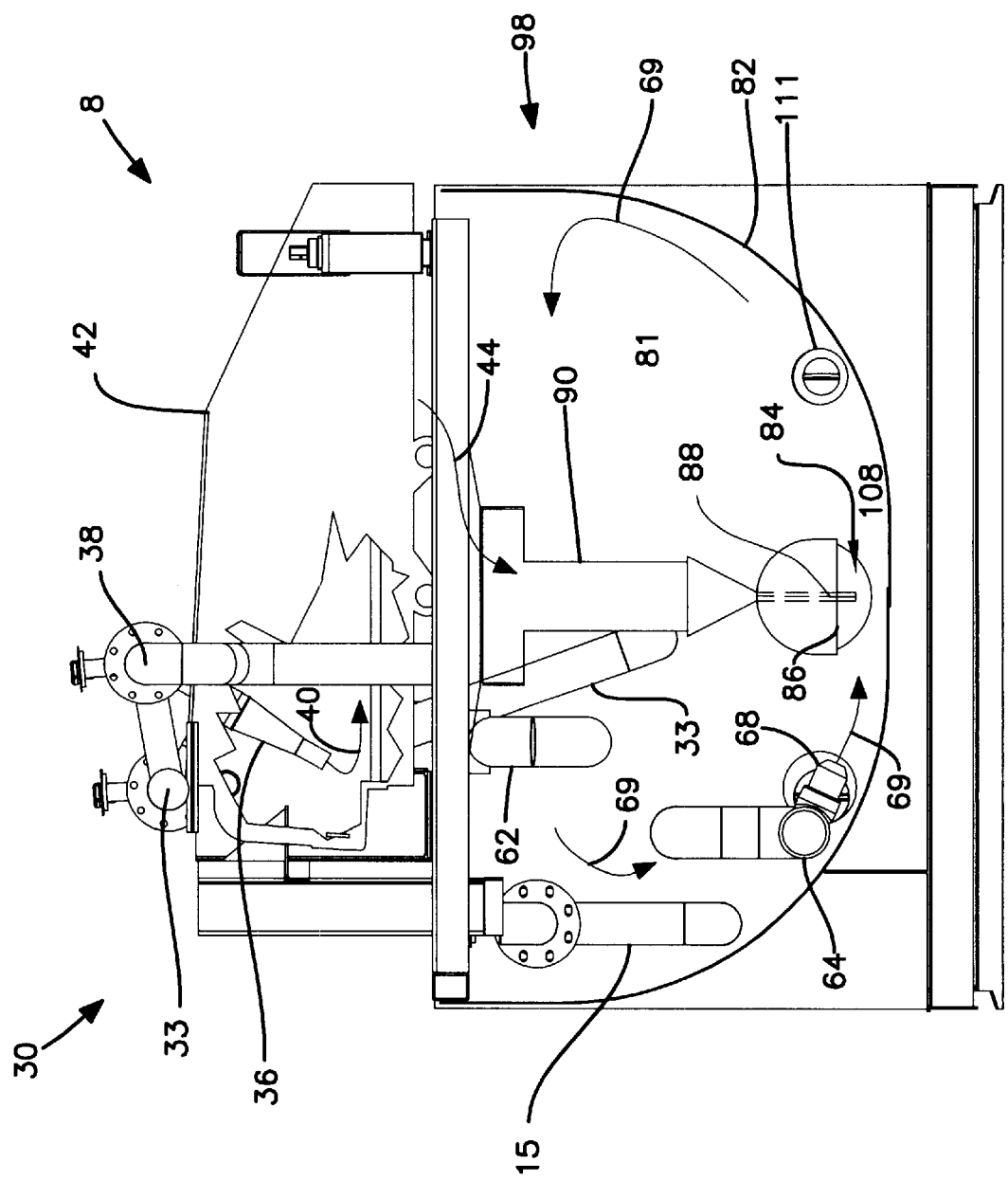
FIG. 5 is an end view of one embodiment of a slurry cleaning, mixing and recycling system in accordance with the near side tank wall removed.

The actual construction of one embodiment of a slurry, cleaning, mixing and recycling system 8 is shown in FIGS. 3 through 5. FIG. 3 is one view of a slurry cleaning, mixing and recycling system 8 for processing slurry used in the horizontal directional drilling industry comprising the manifold assembly 98 in accordance with the claimed invention.

FIG. 4 is a side view of one embodiment of a slurry cleaning, mixing and recycling tank system 8 with the near side tank wall removed in order to show the placement of the shaker 17, the cleaner 30 and the components comprising the manifold assembly 98. FIG. 4 also shows the shaker underflow path 24, the cleaner underflow path 44 into the combined underflow line 90 and the liquid flow path 84 into the multi-input suction line 92.

FIG. 5 is an end view of one embodiment of a slurry, cleaning, mixing and recycling tank system 8, as viewed from the cleaner 30 end of the tank 82, with the near side tank wall removed. This view shows the flat bottomed semi-circular shape of the tank 82. FIG. 5 also shows the angular position of the roll gun jets 68 relative to the bottom of the tank 82. The liquid within the roll gun line manifold 64 exits the roll gun jets 68 at a high velocity and is resisted by the liquid ready for use 81 within the tank 82. Therefore, the liquid within the tank 82 follows a circular/rolling liquid flow path 69. Accordingly, any micro-solids 108 and un-mixed additives are kept in suspension. Moreover, FIG. 5 shows one embodiment of the manifold assembly combined underflow liquid merging fin 88.

Figure 6:
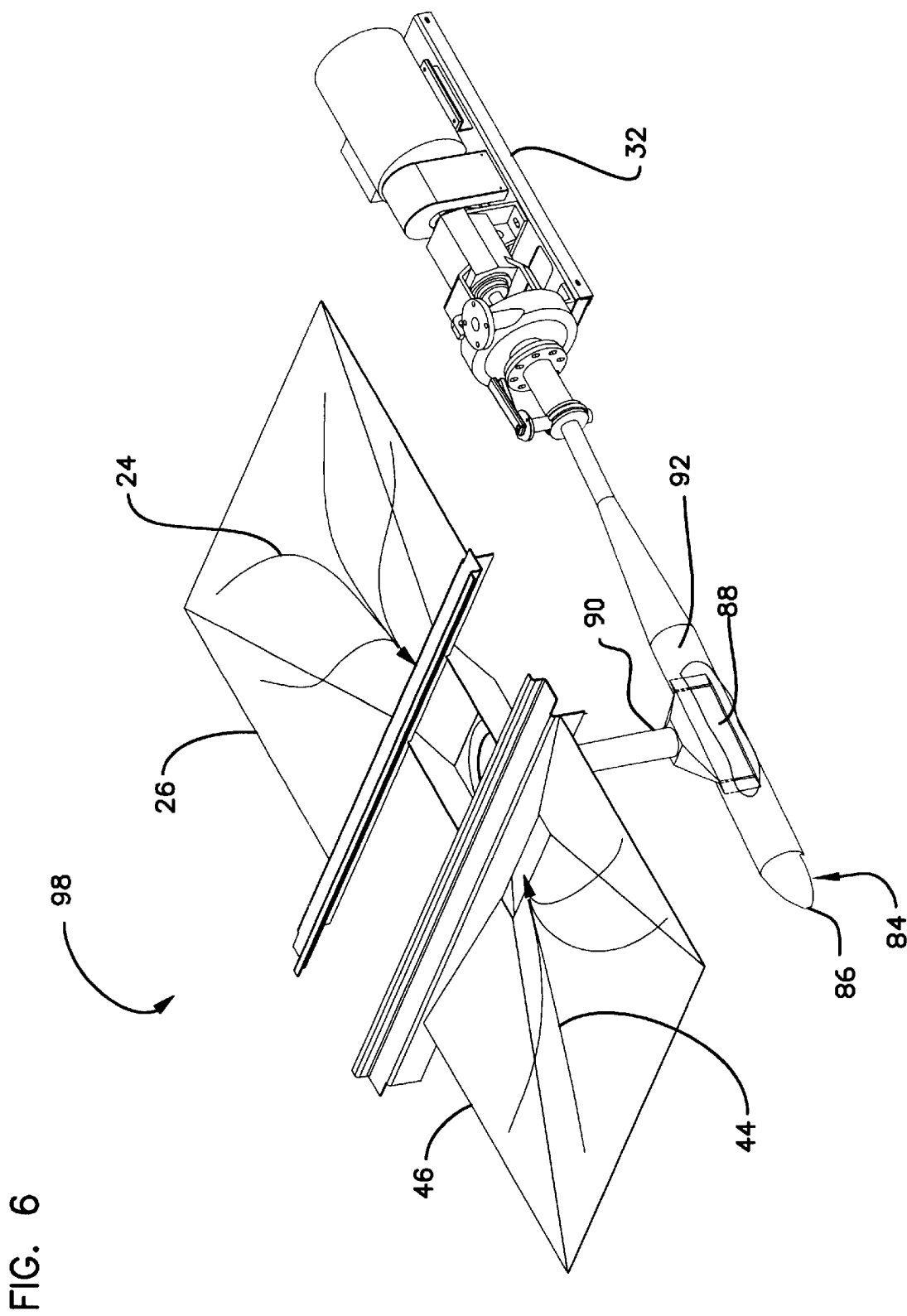
FIG. 6 is an isometric view of one embodiment of a manifold assembly with primary and secondary filters removed.

FIG. 6 is an isometric view of one embodiment of the manifold assembly 98. As shown in FIG. 4, the manifold assembly 98 is an internal component of the slurry, cleaning, mixing and recycling tank system 8. It may also be placed externally or located as a separate independent element between multiple tanks.

In more detail, the manifold assembly 98 includes the multi input suction line 92, which forms a horizontal fluid line. The horizontal fluid line has a wall 85 that defines a lumen 87 through which a stream of fluid can flow. The inlet orifice 86, which has an elbow configuration in one possible embodiment, is connected to one end of the multi input suction line 92. The opposite end of the multi-input suction line is tapered 89 to reduce the diameter of the lumen 87 as it feeds into the cleaner pump 32. This taper 89 reduces the risk of inducing turbulence in a fluid stream as it flows from the multi input suction line 92, through a reduced diameter of the lumen 87, and into the cleaner pump 32.

The underflow line 90 forms a vertical fluid line that has an input portion and an output portion. The input portion has two inputs. The first input is formed by the underflow trough 26 and is in fluid communication with the first filter 17. The second input is formed by the underflow trough 46 and is in fluid communication with the second filter 30.

The output portion forms the underflow liquid merging fin 88, which passes through the wall 85 of the multi input suction line 92. In this configuration, the underflow liquid merging fin 88 is positioned within the lumen 87. As described above, the underflow liquid merging fin 88 is elongated and is substantially parallel to the lumen 87. The end portions 91 and 93 of the underflow liquid merging fins 88 are tapered to reduce the coefficient of drag and minimize the turbulence caused by fluid flowing through the lumen 87 of the multi input suction line 92. Given this configuration, there is a reduced pressure in the stream of liquid as it passes by the underflow liquid merging fin 88.

Figure 7A:
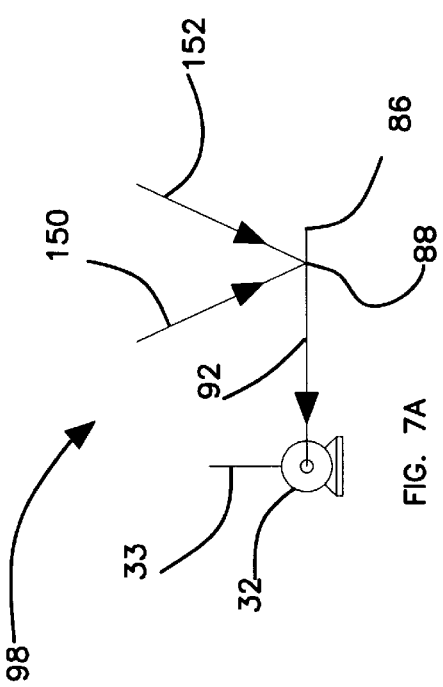
FIGS. 7A–7D are flow diagrams of alternative embodiments of manifold assembly arrangements.
Figure 7B:
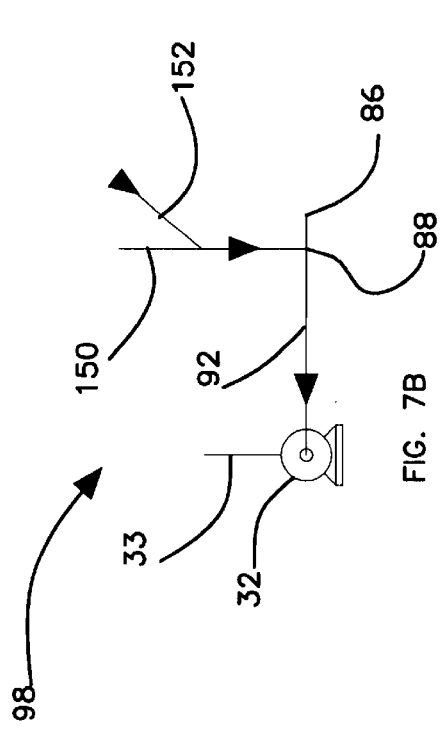
Figure 7C:
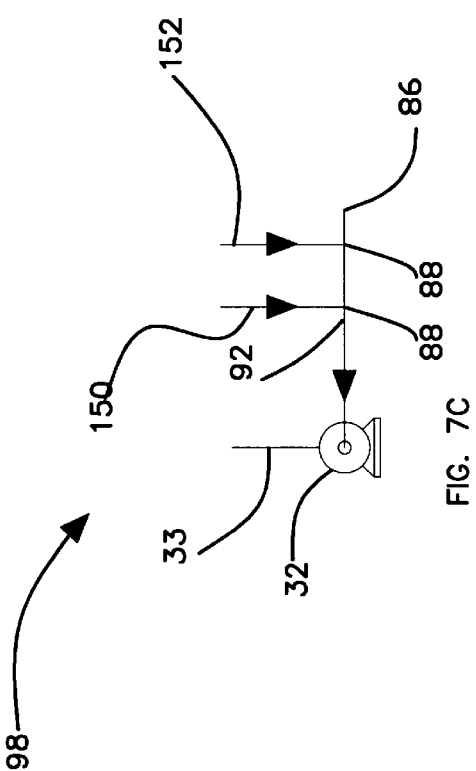
Figure 7D:
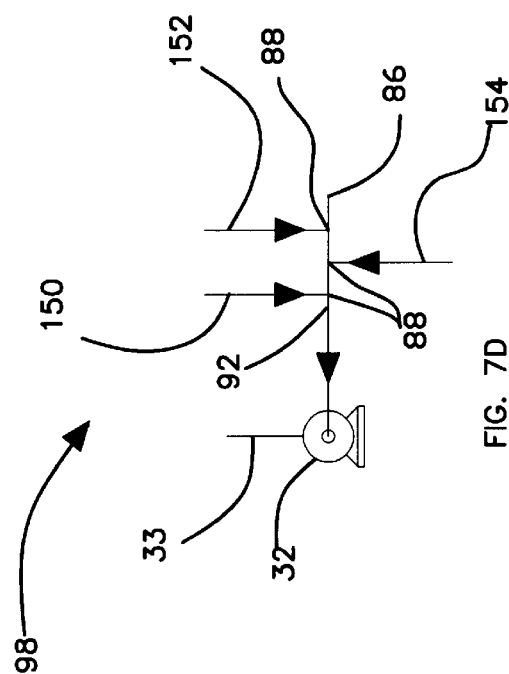

Furthermore, the underflow liquid merging fin 88 has a bottom edge 95 that is positioned proximal to the wall 85 of the multi input suction line 92. In this configuration, the underflow liquid fluid line 90 is in fluid communication with the lumen 87. In one possible embodiment, the bottom edge 95 of the fluid line does not touch the wall 85 of the multi input suction line 92. In other possible configurations, the bottom edge 95 of the underflow liquid merging fin 88 is in contact with or anchored to the wall 85, but there are still orifices or fluid passages providing fluid communication between the underflow line 90 and the lumen 87. FIGS. 7A–7D illustrate four alternative embodiments for combining multiple fluid flows into the multi-input suction line 92. FIG. 7A shows a primary flow 150 and a secondary flow 152 simultaneously combining with the multi-input suction line 92 via the combined underflow liquid merging fin 88. FIG. 7B shows a secondary flow 152 combining with a primary flow 150 then into the multi-input suction line 92 via the combined underflow liquid merging fin 88. FIG. 7C shows the primary flow 150 and secondary flow 152 individually entering into the multi-input suction line 92 via the combined underflow liquid merging fin 88. FIG. 7D, shows a primary flow 150, a secondary flow 152 and a tertiary flow 154 individually entering into the multi-input suction line 92 via the combined underflow liquid merging fin 88. The manifold design allows a variety of suction entries into the manifold assembly 98.

Figure 8:
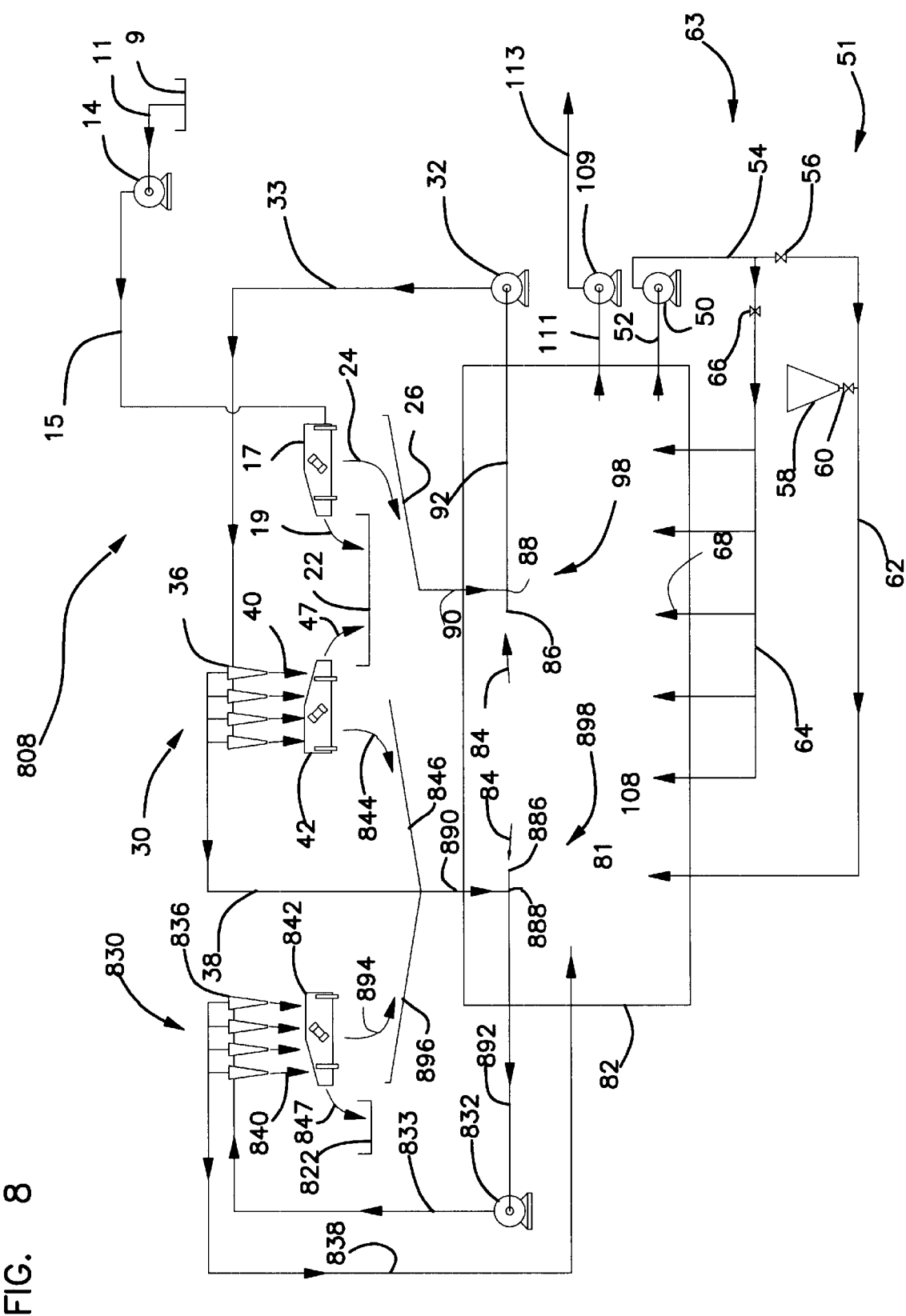
FIG. 8 is a flow diagram of one embodiment of a slurry cleaning, mixing and recycling system using two manifold assemblies.

It can be appreciated that additional slurry, cleaning, mixing and recycling processes can be added without departing from the scope of the claimed invention. One embodiment of a cleaning, mixing and recycling system 8 is shown in FIG. 8. (Note that reference numbering shown in FIG. 8 for components previously described are the same and the additional components have been referenced by the same numbers increased by the value of 800.)

FIG. 8 illustrates a flow diagram of one embodiment of a slurry cleaning, mixing and recycling system using two manifold assemblies 98, 898. The dual manifold assembly slurry cleaning, mixing and recycling system 808 can be used, for example, in the horizontal directional drilling industry.

The flow diagram in FIG. 8 illustrates one embodiment of a closed loop system. As discussed above, the drilling slurry to be cleaned is pumped from the slurry reservoir 9 and the cleaned liquid is returned through the rig charge pump discharge line 113. One sequence for processing the slurry begins by pulling the slurry to be cleaned, a mixture of treated drilling liquid and drilling solids, from the slurry reservoir 9 by the pit pump 14 via the pit pump suction line 11 and routing the slurry to the shaker 17 via the slurry line 15. The shaker 17 separates the slurry into spoils, coarse drilling solids and a partially cleaned liquid referred to as filtered slurry. The spoils from the shaker 17 follow the spoils discharge path 19 and fall into the spoils discharge tank 22. The filtered slurry follows the shaker flow path 24 into the first manifold assembly 98.

The first manifold assembly 98 is used for combining the various processed drilling liquids and controls their flow path. In one embodiment, the first manifold assembly 98 includes an underflow trough 26, an underflow line 90, a combined underflow liquid merging fin 88, an inlet orifice 86, a multi-input suction line 92 and a cleaner pump 32.

Filtered slurry follows the shaker underflow path 24 to the shaker underflow trough 26 and is received by the first manifold assembly 98. Liquid flowing from the shaker 42 follows the underflow path 844 to underflow trough 846 and is eventually received at the second manifold assembly 898. The spoils from shaker 42 follow the spoils discharge path 47 and fall into the spoils discharge tank 22. Under the influence of gravity, underflow liquid from the shaker 17 falls into the underflow line 90. The underflow line 90 is sufficiently large to allow entrained air within the liquid flowing from the underflow trough 26 to escape before entering the combined underflow liquid merging fin 88.

Upon entering the underflow line 90, the cleaner pump 32 draws the liquid from the combined underflow line 90 into the multi-input suction line 92 via the combined underflow liquid merging fin 88. Simultaneously, the cleaner pump 32 draws liquid ready for use 81 from the tank 82 through the inlet orifice 86 into the multi-input suction line 92. The liquid from the underflow line 90 and liquid ready for use 81 are merged in the multi-input suction line 92.

The merged combined liquid the first manifold assembly 98 and is pumped through the cleaner feed line 33 to the cleaner 30 which is a secondary cleaning system. The cleaner 30 is a combination filtration unit comprised of hydrocyclones 36 and a secondary shaker 42. The hydrocyclones 36 separate the liquid from the cleaner feed line 33 into underflow liquid and slurry 81. The underflow liquid follows the hydrocyclones underflow path 40 into the second shaker 42.

The second shaker 42 separates the liquid emerging from the hydrocyclone underflow path 40 into spoils and underflow liquid. As discussed above, the spoils follow the cleaner spoils discharge path 47 into the spoils discharge tank 22, while the second shaker underflow liquid follows the cleaner underflow path 844 to the cleaner underflow trough 846.

The second manifold assembly 898 combines the various processed drilling liquids and controls their flow path. In one embodiment, the first manifold assembly 898 includes underflow troughs 896 and 846, an underflow line 890, a combined underflow liquid merging fin 888, an inlet orifice 886, a multi-input suction line 892 and a cleaner pump 832.

Partially cleaned liquid emerging from the shaker underflow paths 844 and 894 flow into the shaker underflow troughs 846 and 896. Under the influence of gravity, the underflow liquid from the second and third shakers 42 and 842 are combined into the underflow line 890. second manifold assembly 898. Through the underflow line 890, the combined liquid from the cleaner underflow paths 844 and 894 enters the second manifold assembly 898. The underflow line 890 is sufficiently large to allow entrained air within the liquid from the underflow troughs 846 and 896 to escape before entering the combined underflow liquid merging fin 888.

Upon entering the underflow line 890, the cleaner pump 832 draws the liquid from the combined underflow line 890 into the multi-input suction line 892. Simultaneously, the cleaner pump 832 draws slurry 81 from the tank 82 through the inlet orifice 886 into the multi-input suction line 892 via the combined underflow liquid merging fin 888. The liquid from the underflow line 890 and 81 merge in the multi-input suction line 892 in the area near the discharge of the combined liquid merging fin 888.

The liquid leaves the second manifold assembly 898 and is pumped through the cleaner feed line 833 to a second cleaner 830 which is also a secondary cleaning system. The cleaner 830 is a combination filtration unit comprised of hydrocyclones 836 and a third shaker 842. The hydrocyclones 836 separate the liquid from the cleaner feed line 833 into underflow liquid and slurry 81. The underflow liquid follows the hydrocyclones underflow path 840 into the third shaker 842.

The third shaker 842 separates the liquid emerging from the hydrocyclone underflow path 840 into spoils and underflow liquid. The spoils follow the cleaner spoils discharge path 847 into the spoils discharge tank 822, while the third shaker underflow liquid follows the cleaner underflow path 894 to the cleaner underflow trough 896. It will be appreciated that if optional underflow trough 46 is provided, the underflow exiting the second shaker 42 may partially follow flow path 44 and partially follow flow path 844.

The liquid from the cleaner underflow trough 846 merges with the liquid from the second cleaner underflow trough 896 and the liquid from the hydrocyclone 836 overflow via the cleaner overflow line 838. The combined liquid flows into the second manifold assembly 898. The liquid from the hydrocyclone 836 overflow, classified as the cleanest filtered liquid within the system, is transported to the tank 82 via the cleaner overflow line 838.

The foregoing description of the specific embodiments of the invention has been presented for the purpose of illustration and description. It is not intended to be exhaustive or to limit the invention to the precise form disclosed. Many modifications and variations are possible in light of the above teaching. It is intended that the scope of the invention be limited not with this description, but rather by the claims appended hereto.

The claimed invention is:

1. A method of cleaning a slurry having first and second filter stages, comprising:
   filtering the slurry at the first filter stage;
   mixing the filtered slurry with liquid ready for use to form a mixture of slurry and liquid ready for use;
   feeding the mixed slurry and liquid ready for use into the second filter stack at a substantially constant rate, the mixture of slurry and liquid ready for use formed entirely with liquid ready for use when no slurry is provided to the first filter stage; and
   filtering the mixed slurry and liquid ready for use through the second filter stage.

2. A method according to claim 1, wherein the first and second filter stages comprise one or more filters.

3. A method according to claim 2, wherein the first and second filter stages comprise shaker separator devices.

4. A method according to claim 1, wherein filtering the mixed slurry and liquid ready for use through a second filter stage includes separating a mixed liquid output from the mixed slurry and liquid ready for use, the method further comprising:
   in a manifold, mixing the filtered mixed liquid output from the second filter stage with the filtered slurry output from the first filter stage and the liquid ready for use to form a mixture for re-circulating to the filter stages.

5. A method according to claim 4, further comprising:
   re-circulating the mixture for re-circulating through the second filter stage.

6. A method according to claim 1, wherein the second filter stage comprises a hydrocyclone portion and the act of filtering a mixed slurry and liquid ready for use through the second filter stage comprises:
   inputting the mixed slurry and liquid ready for use into the hydrocyclone portion;
   outputting a mixed liquid from the hydrocyclone portion as an underflow liquid; and outputting a liquid ready for use.

7. A method according to claim 6, wherein the second filter stage further comprises a shaker separator device adapted to receive the underflow liquid from the hydrocyclone portion, and filtering a mixed slurry and liquid ready for use through the second filter stage further comprises:
   inputting the underflow liquid to the shaker;
   separating solids from the underflow liquid; and
   mixing the underflow liquid with the filtered slurry and the liquid ready for use.

8. A method according to claim 1, further comprising a tank for storing the liquid ready for use;
   wherein the tank comprises a semi-circular portion adapted to minimize dead areas where sedimentation of solids suspended in the liquid ready for use may occur.

9. A method according to claim 8, wherein the tank further comprises plumbing for mixing multiple liquids with the liquid ready for use.

10. A method according to claim 1, further comprising:
    mixing additives with the liquid ready for use.

11. An apparatus for cleaning a slurry, comprising:
    a tank;
    first and second filter stages, each filter stage having an input portion and output portion; and
    a manifold having an input and an output, the input of the manifold being in fluid communication with the output portion of the first filter stage and the tank, the output of the manifold being in fluid communication with the input portion of the second filter stage, the manifold arranged to feed fluid into the input portion of the second filter at a substantially constant rate.

12. An apparatus according to claim 11, wherein:
    the tank is configured to hold a liquid ready for use, the first filter stage is configured to filter a first liquid, and the second filter stage is configured to filter a second liquid;
    the second filter stage is in fluid communication with the manifold; and
    wherein the manifold is configured and arranged to receive the liquid ready for use, the filtered first liquid, and the filtered second liquid.

13. An apparatus according to claim 11, wherein the first and second filter stages further comprise:
    one or more filters.

14. An apparatus according to claim 11, wherein the second filter stage comprises:
    a hydrocyclone having an input portion and an output portion, the input portion of the hydrocylcone being in fluid communication with the output of the manifold, wherein the hydrocyclone is arranged to receive a liquid from the manifold and to separate the liquid into a filtered hydrocyclone underflow liquid and liquid ready for use.

15. An apparatus according to claim 14, wherein the second filter stage further comprises:
    a shaker arranged to receive the filtered hydrocyclone underflow liquid, separate solids from the filtered hydrocylone underflow liquid, and communicate the filtered hydrocyclone underflow liquid to the manifold.

16. An apparatus according to claim 11, wherein the tank comprises:
    a semi-circular bottom portion.

17. An apparatus according to claim 11, wherein the tank comprises a single tank.

18. An apparatus according to claim 11, wherein the tank is arranged to hold a liquid ready for use, and the apparatus further comprises:
    a hopper having an input portion and an output portion, the input portion being adapted to receive additives to be mixed with the liquid ready for use; and
    a conduit in fluid communication with the output portion of the hopper and the tank;

wherein additives to be mixed with the liquid ready for use are introduced into the input portion of the hopper and are transferred to the tank through the conduit.

19. An apparatus according to claim 11 wherein the tank is arranged to hold a liquid ready for use, the apparatus further comprising:

a liquid transferring device in fluid communication with the tank and adapted to receive liquid ready for use from the tank; and a jet portion arranged to return liquid ready for use into the tank from the liquid transferring device thereby agitating the liquid ready for use that is located within the tank.

20. An apparatus according to claim 11, wherein the manifold comprises:

a first liquid line, the first liquid line including an input portion and an output portion; and a second liquid line, the second liquid line in fluid communication with the output portion of the first liquid line.

21. An apparatus according to claim 20, wherein:

the input portion of the first liquid line defines two or more input ports;

the second liquid line has a wall defining a lumen; and the output portion of the first liquid line projects into the lumen of the second liquid line.

22. An apparatus according to claim 21 wherein:

the output portion of the first liquid line has a cross-section;

the cross section has a length and a width, the length being substantially greater than the width; and the length runs substantially parallel to the lumen of the second liquid line.

23. An apparatus according to claim 22 wherein:

the output portion of the first liquid line has an ending edge; and the output portion of the second line extends through the lumen of the second liquid line so that the ending edge is proximal to the wall of the second liquid line while maintaining fluid communication between the output portion of the first liquid line and the second liquid line.

24. A method of cleaning a slurry, comprising:

providing an apparatus having a first filter stage arranged to form a first filter stage underflow liquid and a second filter stage arranged to form a second filter stage underflow liquid and a liquid ready for use;

transferring the slurry to the first filter stage;

separating solids from the slurry and discharging the first filter stage underflow liquid from the first filter stage;

routing the first filter stage underflow liquid to a continuous suction manifold assembly;

mixing the first filter stage underflow liquid with the second filter stage underflow liquid discharged from the second filter stage and the liquid ready for use, resulting in a combined liquid mixture;

transferring the combined liquid mixture to the second filter stage at a substantially constant rate;

routing the second filter stage underflow liquid from the second filter stage to the continuous suction manifold assembly; and discharging liquid ready for use from the second filter stage into a tank.

25. The method according to claim 24, further comprising:

circulating the liquid ready for use in the tank.

26. The method according to claim 25, wherein the liquid ready for use in the tank is kept is constant agitation.

27. The method according to claim 24, wherein the second filter stage comprises:

a hydrocyclone portion for separating the liquid mixture into a hydrocyclone underflow liquid and the liquid ready for use.

28. The method according to claim 27 wherein the second filter stage further comprises:

one or more filters.

29. The method according to claim 24, wherein the tank has a semi-circular portion and a flat bottom portion for minimizing dead areas where sedimentation of solids may occur.

30. The method according to claim 24, wherein the tank comprises integral plumbing for controlling the mixing of multiple liquids and reducing the possibility of inducing air into the continuous suction manifold assembly.

31. The method according to claim 37, further comprising:

mixing additives with the liquid ready for use.

32. An apparatus for cleaning a slurry, comprising:

a tank;

first filter and second stages, each filter stage having an input portion and output portion;

a manifold having an input and an output, the input of the manifold being in fluid communication with the output portion of the first filter stage and the tank, the output of the manifold being in fluid communication with the input portion of the second filter stage; and the input portion of the second filter stage being adapted to receive mixed liquid and the output portion of the second filter stage being in fluid communication with the manifold and the output portion of the first filter stage, the second filter stage being adapted to filter the mixed liquid;

wherein the filtered mixed liquid flowing from the output portion of the second filter stage is mixed with the filtered slurry and a liquid ready for use in the manifold and the mixed slurry and liquid ready for use is input to the second filter stage at a substantially constant rate.

* * * * *

UNITED STATES PATENT AND TRADEMARK OFFICE
CERTIFICATE OF CORRECTION

PATENT NO.     : 6,517,733 B1
DATED          : February 11, 2003
INVENTOR(S)    : Carlson It is certified that error appears in the above-identified patent and that said Letters Patent is hereby corrected as shown below:

<u>Column 7,</u>
Line 48, "direct the, liquid flow" should read -- direct the liquid flow --

<u>Column 14,</u>
Line 14, "kept is constant" should read -- kept in constant --
Line 32, "claim 37," should read -- claim 24, --

Signed and Sealed this

Ninth Day of December, 2003

JAMES E. ROGAN
*Director of the United States Patent and Trademark Office*